United States Patent
Andersen et al.

(10) Patent No.: US 7,730,472 B2
(45) Date of Patent: Jun. 1, 2010

(54) DYNAMIC LINKING OF MODULES IN A PRE-OPERATING SYSTEM ENVIRONMENT

(75) Inventors: Gregory T. Andersen, Meridian, ID (US); Alexander Jizrawi, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 10/949,124

(22) Filed: Sep. 24, 2004

(65) Prior Publication Data

US 2006/0070053 A1 Mar. 30, 2006

(51) Int. Cl.
*G06F 9/44* (2006.01)
(52) U.S. Cl. .......................... 717/162; 717/166; 713/2
(58) Field of Classification Search ......... 717/162–166; 713/2
See application file for complete search history.

(56) References Cited

U.S. PATENT DOCUMENTS

| 5,778,231 | A | * | 7/1998 | van Hoff et al. ............. 717/143 |
| 6,052,778 | A | * | 4/2000 | Hagy et al. ..................... 713/2 |
| 6,141,698 | A | * | 10/2000 | Krishnan et al. ............ 719/331 |
| 6,317,870 | B1 | * | 11/2001 | Mattson, Jr. ................. 717/151 |
| 6,425,038 | B1 | * | 7/2002 | Sprecher ....................... 710/269 |
| 7,162,711 | B2 | * | 1/2007 | Czajkowski et al. ......... 717/114 |
| 2005/0071617 | A1 | * | 3/2005 | Zimmer et al. .................. 713/1 |

* cited by examiner

*Primary Examiner*—Wei Y Zhen
*Assistant Examiner*—Phillip H Nguyen

(57) ABSTRACT

A dynamic linking loader is provided for a pre-operating-system environment. Such a loader can provide a simple, flexible, and cost effective way for loading modules at run time in a pre-operating-system environment.

28 Claims, 16 Drawing Sheets

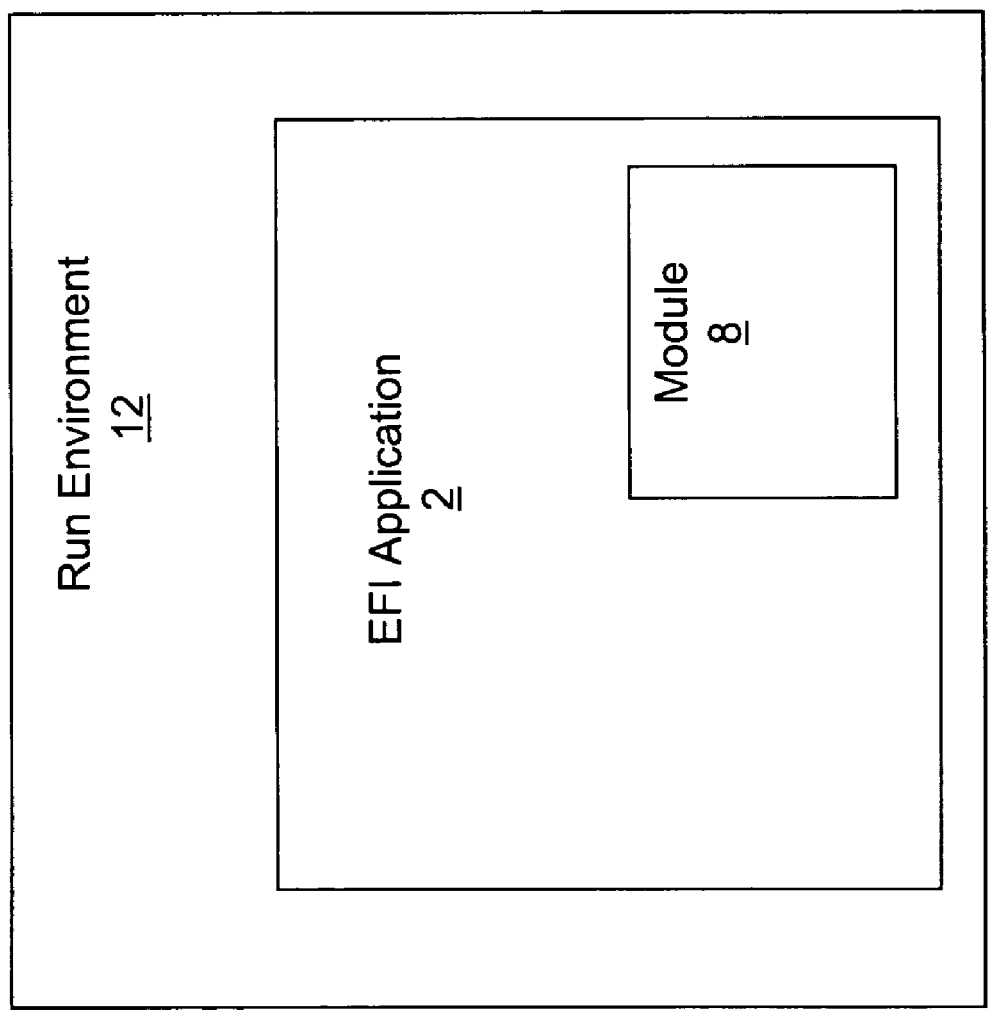

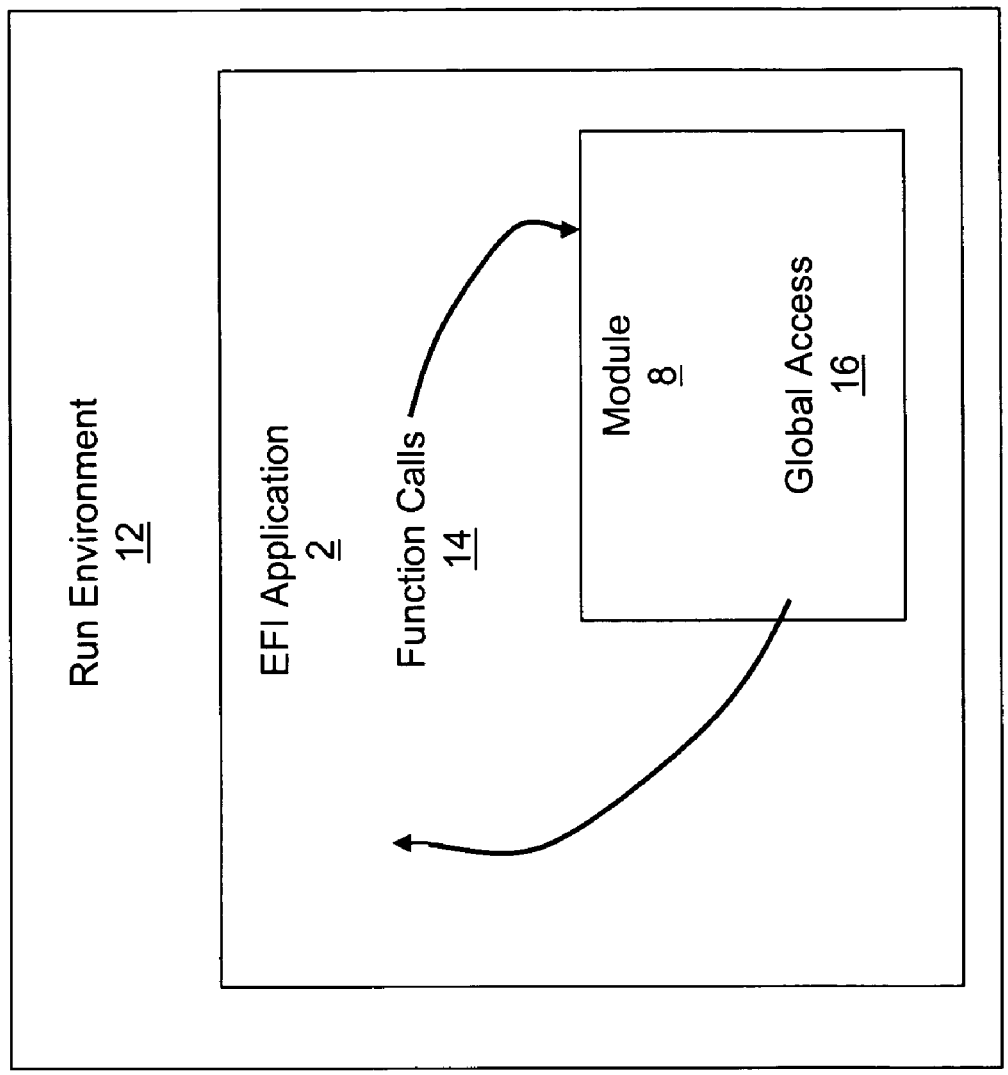

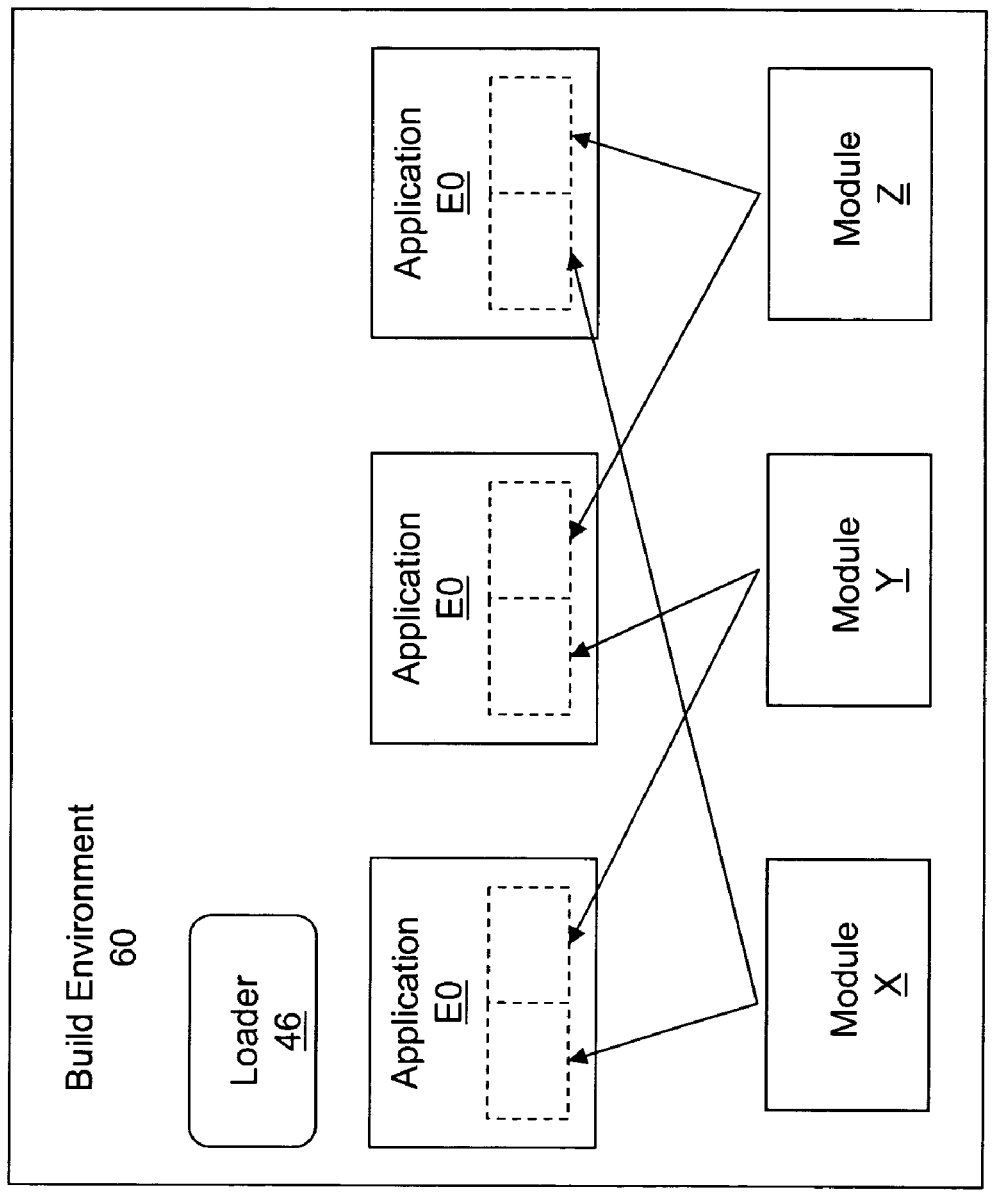

DYNAMIC LINKING OF MODULES IN A PRE-OPERATING SYSTEM ENVIRONMENT

BACKGROUND

Before a manufacturer installs an operating system on a computer system, typically it tests and verifies the operation of both the hardware and firmware.

Pre-Operating System Environments—For many computer systems with Intel central processing units, the pre-operating system verification environment is the extensible firmware interface (EFI). The EFI environment is typically used with verification tools to test interactions between chipsets, system busses, I/O busses, peripherals, system firmware and other system level entities. EFI is an industry standard and applies to all IPF systems. Specifically, the EFI firmware interfaces with the System Abstraction Layer (SAL), which in turn interfaces with the Processor Abstraction Layer (PAL), which interfaces with a hardware IPF processor.

The EFI environment manages a computer system's memory until an operating system is booted. Pre-operating system verification applications can be run both inside of EFI (EFI applications) and on top of EFI (non-EFI applications) as part of the EFI environment utilizing the EFI library of functions such as the real time clock and tables of EFI parameters and variable names. The EFI library is also accessible by the operating system after it is booted.

Compilation—Computers typically execute low-level machine languages that are easily processed by computer processors but that are difficult and time consuming for programmers to use, whereas programming is typically done in a high level language that is easier and less time consuming for programmers to use. A compiler is a translator whose source language is a high-level language and whose object language is close to the machine language of an actual computer, either being an assembly language or some variety of machine language (relocatable or absolute). Translation of a high-level source language into executable machine language programs often involves more than one translation step. For example, it is not uncommon to have a program first compiled into a machine-dependent assembly language, then assembled to produce relocatable machine code, and finally loaded and linked to produce executable machine code. Moreover, the compilation step itself typically involves a number of passes that progressively translate the program into various intermediate forms before producing the final object program.

Loaders—A loader, or linking loader, is a translator step whose object language is the actual executable machine code, and whose source language is almost identical, but usually consists of machine language programs in relocatable form together with tables of data specifying points where the relocatable code must be modified to become truly executable. This step is performed just prior to execution after actual memory has been allocated.

Libraries—A scope is typically classified as dynamic or static. A dynamic scope rule defines a scope in terms of program execution at run time. A static scope rule defines a scope in terms of the structure of the program at build time (translation time). Programs typically contain function calls to modules in a library that is available to the compiler. In a static library environment, the modules referenced by the program function calls are linked and loaded at build time and cannot be changed at run time. In a dynamic environment, the library is available at run time and the linking and loading of the library modules is done just prior to initialization of execution.

References—Referencing is the operation of retrieving the data or program object currently associated with a given identifier using the unique currently active association for the identifier. References to identifiers are classified as local references if they use an association active only within the subprogram currently being executed. A global reference is a reference to an association active throughout program execution. A local environment or local referencing environment is used to designate those local associations introduced at the last change in the referencing environment.

The above-described concepts are discussed and illustrated below in conjunction with FIGS. 1A-3.

Referring to FIG. 1A, a static pre-operating system build time environment 10 is shown that includes an EFI application 2 and a non-EFI application 4, both of which include function calls to EFI library module 8. The library module 8 is in the form of relocatable machine code with a table of data specifying points where the relocatable code must be modified to become truly executable machine code. The static pre-operating system build time environment 10 includes a static loader 6. During the final step of the compilation of the application 2, the static loader 6 links a first copy of the module 8 to the application 2 and modifies all of the places where a relative address needs to be replaced with an absolute address. In a similar manner, during the final step of the compilation of the non-EFI application 4, the static loader 6 links a second copy of the module 8 to the application 4 and modifies all of the places where a relative address needs to be replaced with an absolute address. In such a static pre-operating system build time environment, each function call in each application 2 and 4 requires a copy of the relocatable library module 8. Any change to the source code in the applications 2 and 4 or the called module 8 requires a complete recompilation of the applications.

Referring to FIG. 1B, the static pre-operating system run time environment 12 associated with the static pre-operating build environment 10 (FIG. 1A) no longer has access to a loader. The compiled EFI application 2 linked to the compiled EFI library module 8 is in non-relocatable machine code format and is loaded into memory to be executed.

FIG. 1C shows the static pre-operating system run time environment 12 associated with the static pre-operating build environment 10 during execution. The compiled application 2 contains function calls 14 which are satisfied by the compiled and linked copy of EFI module 8. The variables inside of the library module 8 with global references have access to all the variables associated with the compiled application 2. The reference environment is static and is set at build time and cannot be changed without a recompilation. Also, if there is any change in the code for application 2 the entire package needs to be recompiled, and if there is any change in the code for module 8, the entire package needs to be recompiled. Therefore, if there is any additional required functionality, the functionality has to be added in a static pre-operating build environment and the entire package needs to be recompiled.

Referring to FIG. 2A, a static pre-operating system build time environment 20 includes of a number (here four) of applications AA-DD, some of which are EFI applications and some of which are non-EFI applications, and all of which require functionality from EFI library module NN. The static loader 6 copies module NN into each of the applications, links the relocatable machine code of the module NN to the machine code of the applications AA-DD, and produces four applications in absolute machine code format capable of being executed.

Referring to FIG. 2B, the static pre-operating system run time environment 22 associated with the static pre-operating build environment 20 (FIG. 2A) no longer has access to a loader. The absolute binaries of applications AA-DD can be executed. There can be no changes to the applications or the shared library module without recompiling. Also, there is no way to add or remove functionality to or from any of the applications AA-DD without a complete recompilation of the entire set.

Referring to FIG. 3, a pre-operating system environment upgrade process 112 includes a static build time environment 112, a static run time environment 114, and an upgrade environment 120. As previously described, during static build time 110, EFI applications 100 and non-EFI applications 104 are compiled using the EFI library 102 to satisfy function call references. This is done by the static loader 106 copying modules from the EFI library 102 into the applications and linking them in an absolute machine code format. During the static run time 114, the compiled EFI application 116 with linked library modules is executed. During the static run time 114, the compiled non-EFI application 118 with linked library modules is also executed. If there is a code upgrade 122 to an EFI application or a non-EFI application during an upgrade time 120, the process returns to the build time environment 110 via the path 124 and recompiles the applications. If there is a code upgrade to a referenced library module the process returns to the build time environment 110 via the path 124 and recompiles the applications after recompiling the EFI library 106 with the upgraded module. There is no means to change the static environments without starting the process over from the beginning. This is inconvenient, costly, procedurally complex, inflexible, and time intensive.

SUMMARY

A dynamic linking loader is provided for a pre-operating-system environment.

Such a loader can provide a simple, flexible, and cost effective way for loading modules at run time in a pre-operating-system environment.

BRIEF DESCRIPTION OF THE DRAWINGS

FIG. 1B (prior art) is a block diagram of the run time environment of the applications of FIG. 1A.

FIG. 1C (prior art) is a block diagram of the run time environment of FIG. 1B showing the conventional way functional calls are made and global variables are made available.

FIG. 6A is a block diagram of a build time environment showing an application built with several different sets of library modules according to an embodiment of the invention.

DESCRIPTION OF THE INVENTION

Figure 1A:
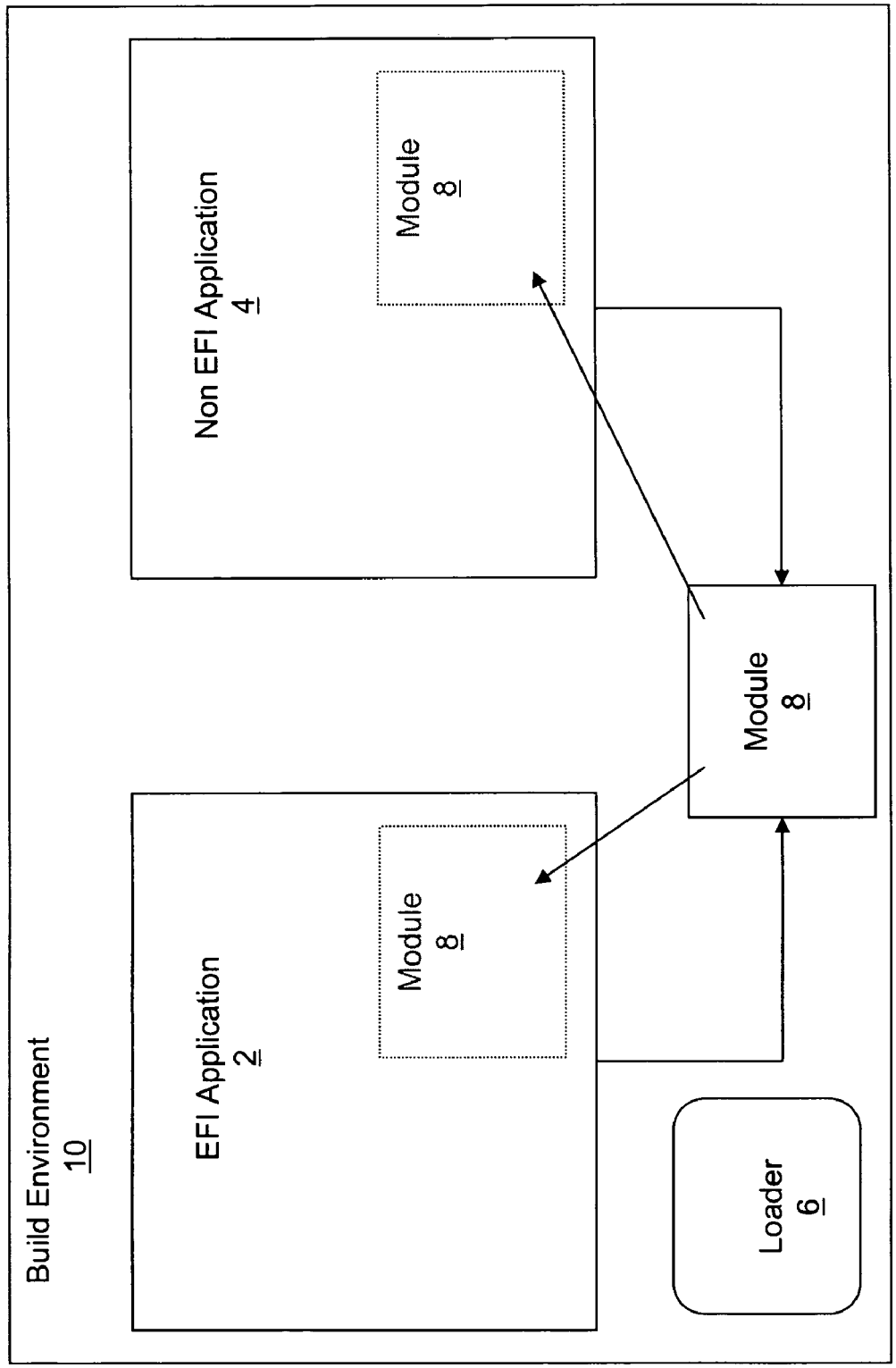
FIG. 1A (prior art) is a block diagram showing a static build time environment with a static loader.
Figure 2A:
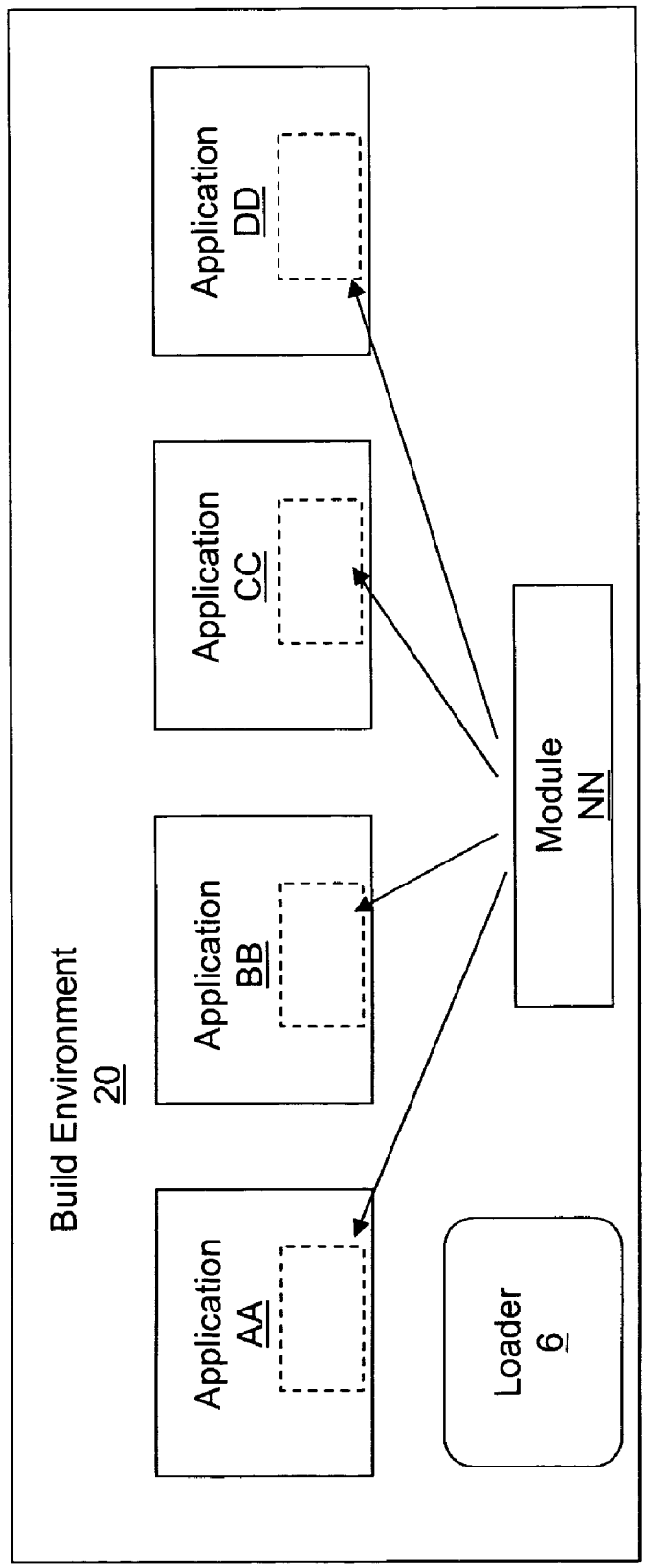
FIG. 2A (prior art) is a block diagram of a static build time environment showing several applications requiring the same library module.
Figure 2B:
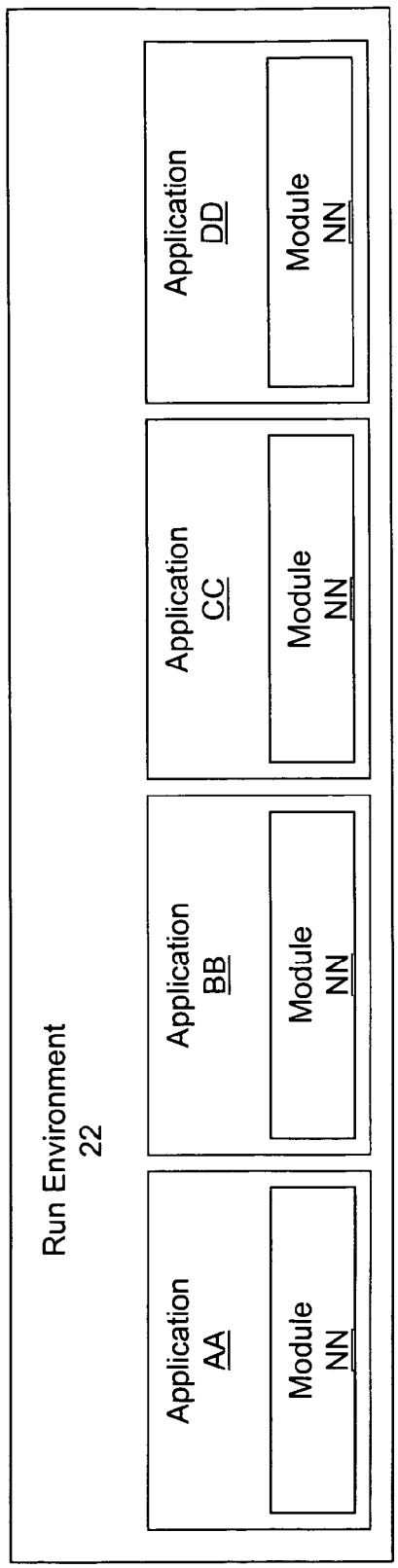
FIG. 2B (prior art) is a block diagram of a static run time environment showing the several applications of FIG. 2A with the same library module loaded.
Figure 3:
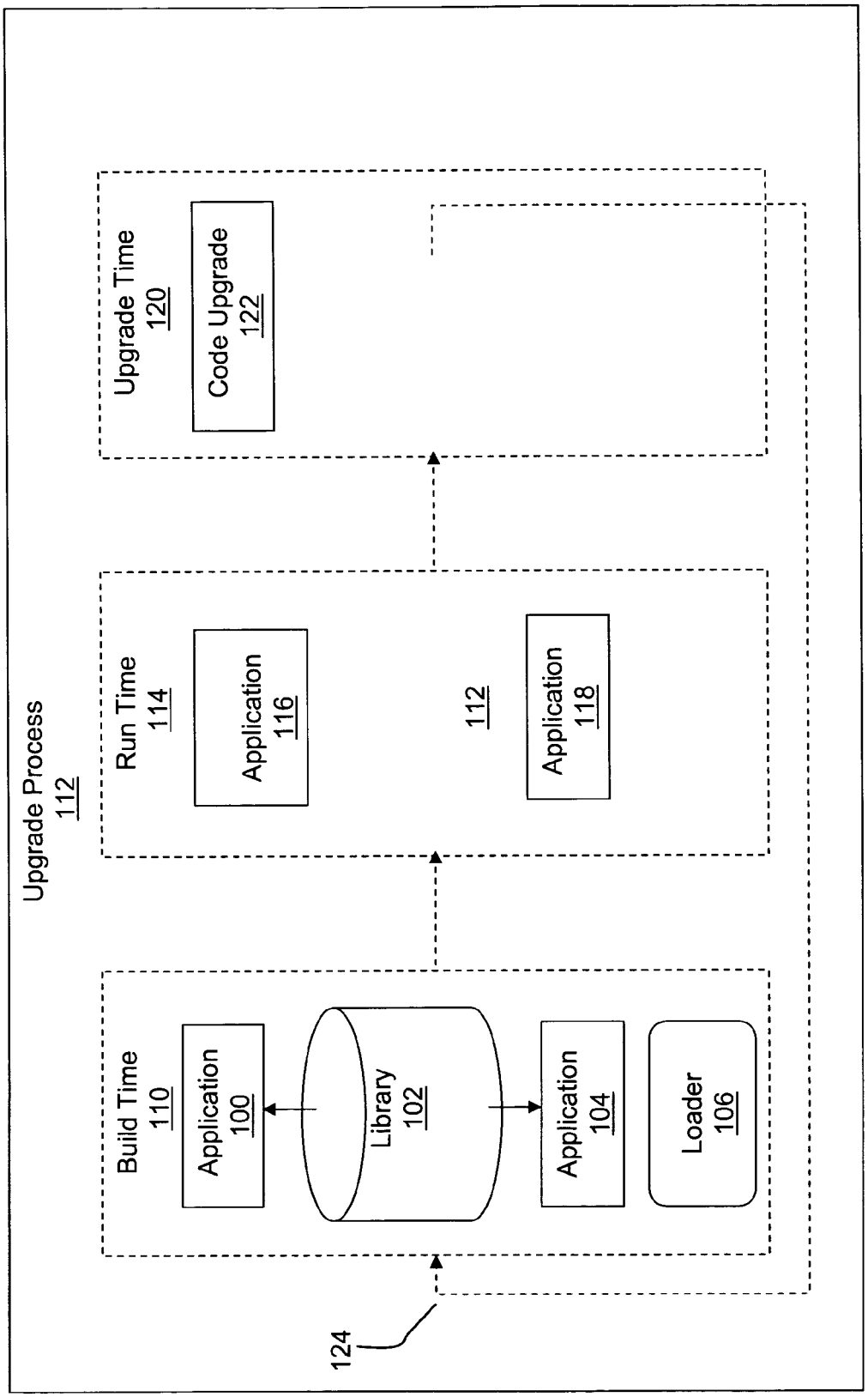
FIG. 3 (prior art) is a functional diagram of a system-verification process with a static loader.
Figure 4A:
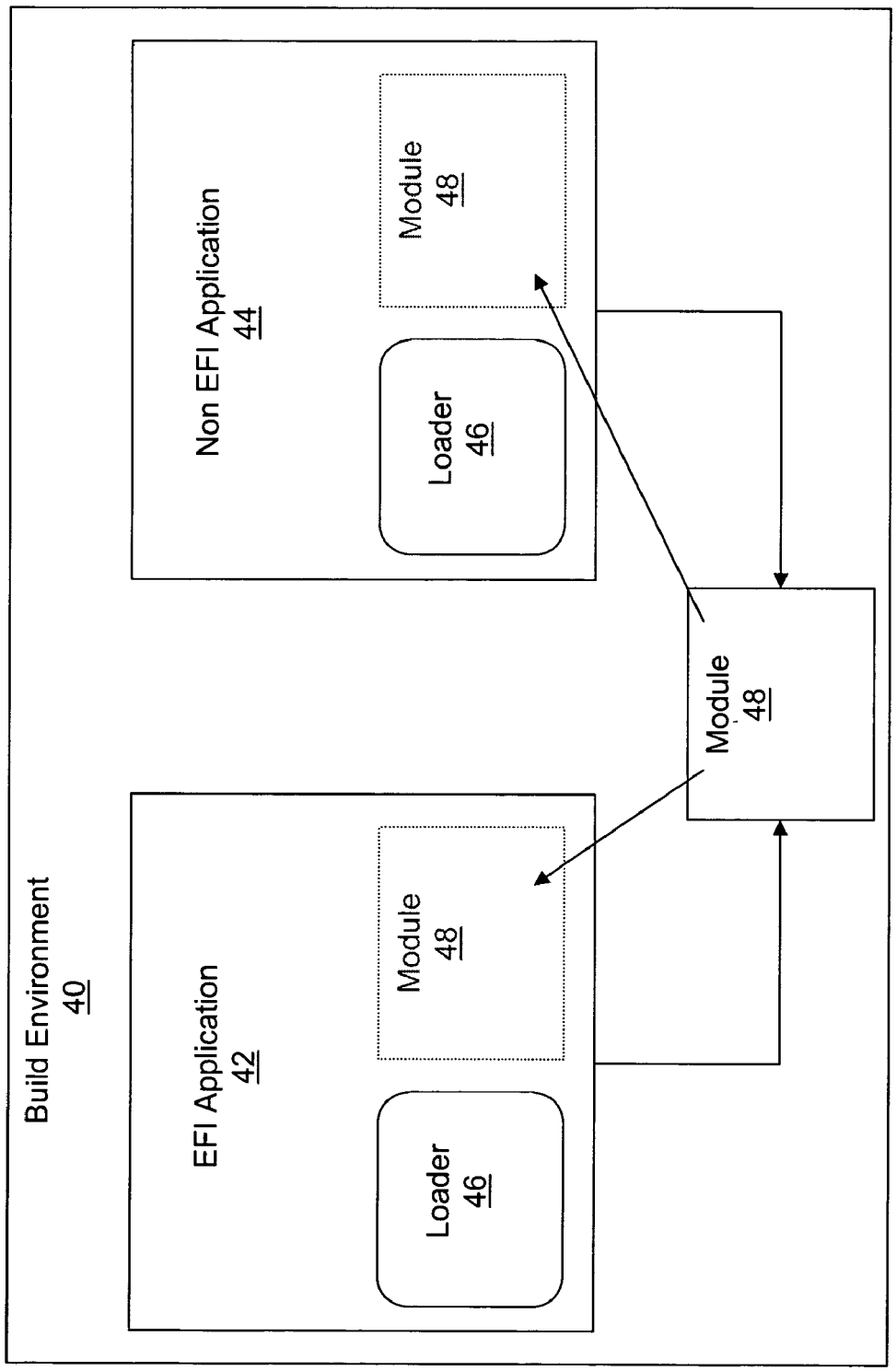
FIG. 4A is a block diagram showing a build time environment with a dynamic loader according to an embodiment of the invention.

Referring to FIG. 4A, a dynamic pre-operating system build time environment 40 is shown that includes an EFI application 42 and a non-EFI application 44, both of which include function calls to EFI library module 48. The library module 48 is in the form of relocatable machine code with a table of data specifying points where the relocatable code must be modified to become truly executable machine code. The dynamic pre-operating system build time environment 40 includes a dynamic loader 46. The dynamic loader 46 is made part of the EFI application 42 and also the non-EFI application 44. The library module 48 is in an Application Binary Format (ABI). The ABI defined by Intel for EFI systems is ELF64. During the compilation of the EFI application 42, a reference to the ABI conforming library module 48 is made and inserted, but not loaded. During the compilation of the non-EFI application 44, another reference to the ABI conforming library module 48 is made and inserted, but not loaded.

Figure 4B:
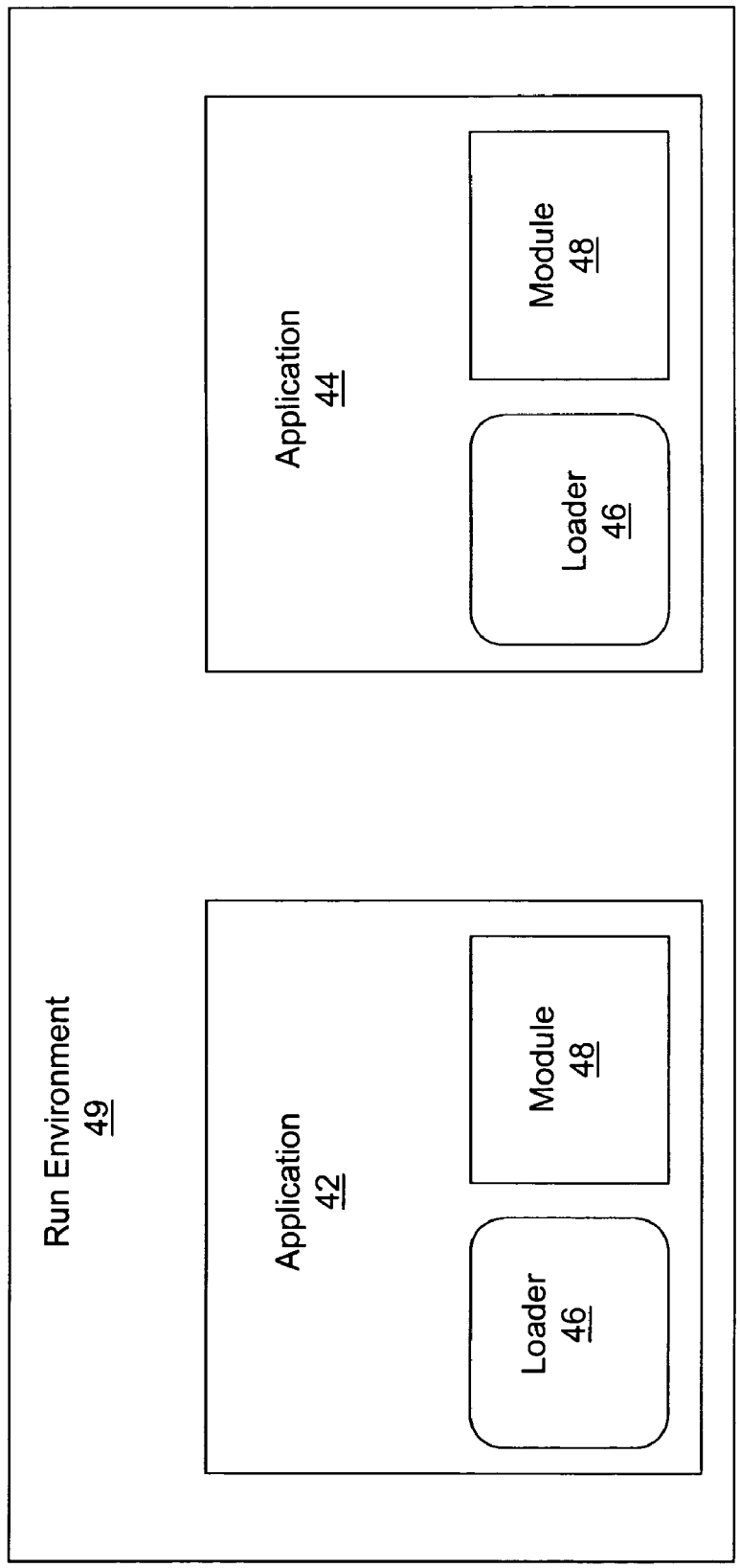
FIG. 4B is a block diagram of the run time environment of the applications of FIG. 4A according to an embodiment of the invention.

Referring to FIG. 4B, the dynamic pre-operating system run time environment 49 associated with the dynamic pre-operating build environment 40 (FIG. 4A) includes the dynamic loader 46 as part of each application. The dynamic loader 46 is a piece of code that understands how to load a module into memory, parse the library module contents, perform the necessary relocations, and finally link any dependencies between the loading application and the module being loaded. The dynamic loader 46 links the loaded copy of the ABI conforming library module 48 to the EFI application 42 and modifies all of the places where a relative address needs to be replaced with an absolute address. In a similar manner, during the loading of the non-EFI application 44, the dynamic loader 46 links a second loaded copy of the ABI conforming library module 48 to the non-EFI application 44 and modifies all of the places where a relative address needs to be replaced with an absolute address. The compiled EFI application 42 linked to the compiled ABI conforming EFI library module 48 is in non-relocatable machine code format and is ready to be executed. In a similar manner, the compiled non-EFI application 44 linked to the compiled ABI conforming EFI library module 48 is in non-relocatable machine code format and is ready to be executed.

After the first execution of the compiled, linked and loaded applications, there can be any number of additional executions at subsequent dynamic run times. If there is an upgrade to the library module 48 and the upgraded library module is recompiled, then the upgraded ABI conforming library module 48 replaces the non-upgraded version of the module in the library, and at the next dynamic run time, the dynamic loader 46 links and loads the upgraded ABI conforming library module 48 to the referencing application without a need to recompile the application.

Figure 4C:
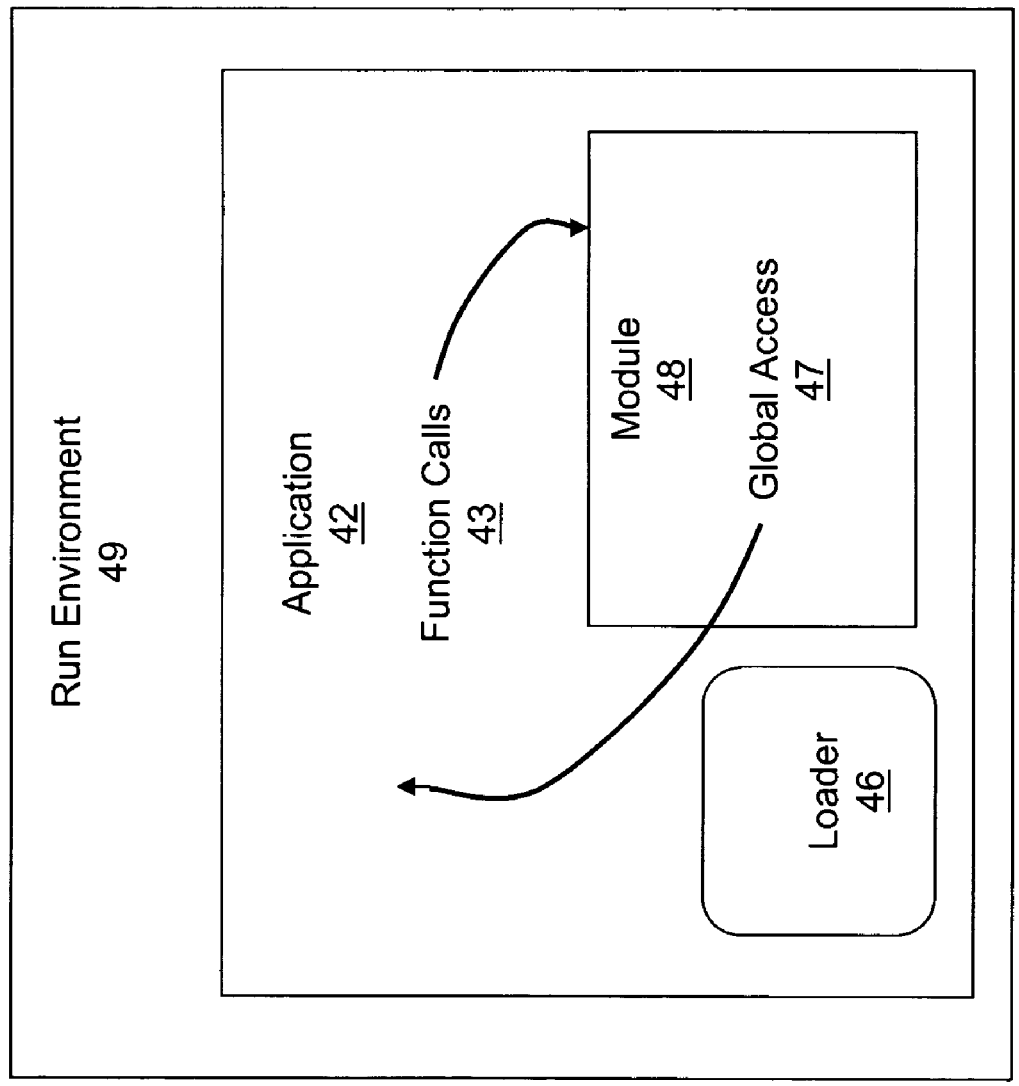
FIG. 4C is a block diagram of the run time environment of FIG. 4B showing the way functional calls are made and global variables accessed according to an embodiment of the invention.

FIG. 4C shows the dynamic pre-operating system run time environment 49 associated with the dynamic pre-operating build environment 40 (FIG. 4A) during execution. The compiled application 42 contains function calls 43 which are satisfied by the compiled and linked copy of ABI conforming EFI module 48. The variables inside of the library module 48 with global references have access to all the variables associated with the compiled application 42. The reference environment is dynamic and is set at run time and thus can be changed without a recompilation of the application if the library is upgraded. Although the dynamic loader 46 is present during execution of the application 42, it is not used until a subsequent loading operation preceding a subsequent execution. And although only one of the applications 42 is shown, the execution of the application 44 is similar.

Figure 5A:
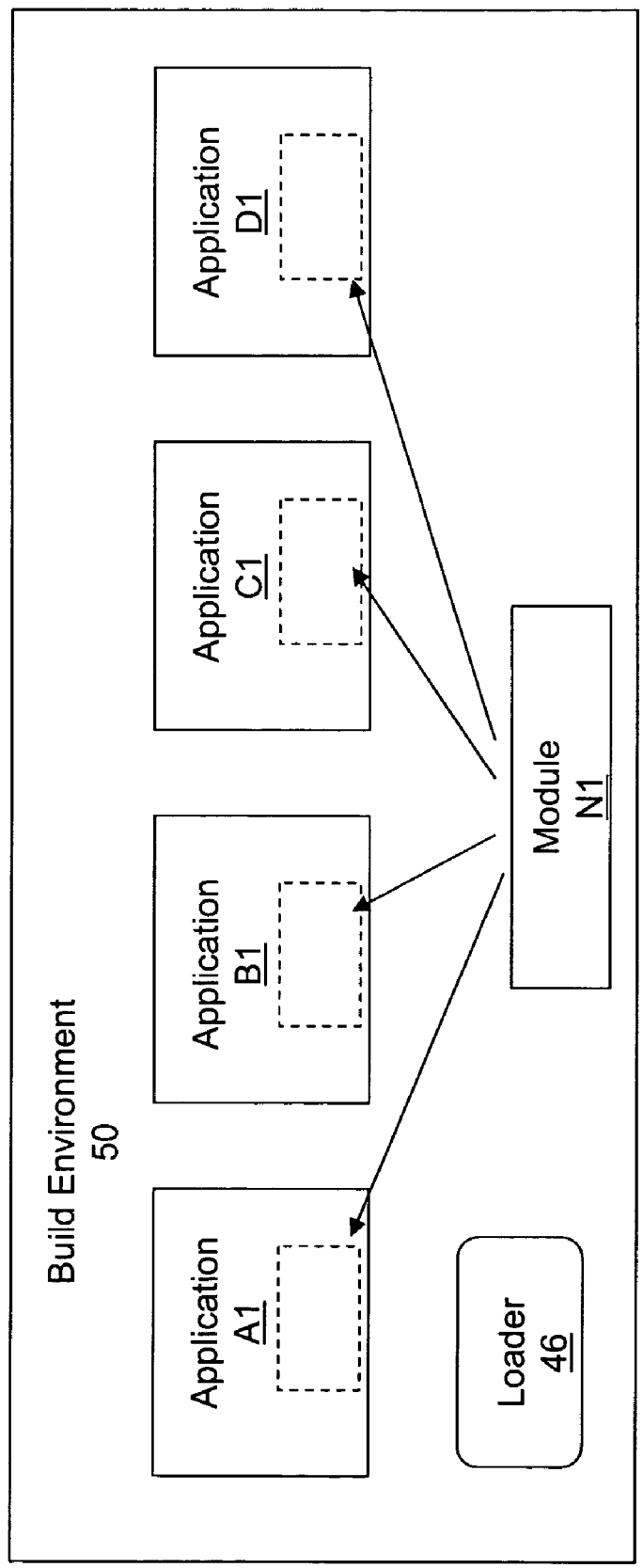
FIG. 5A is a block diagram of a build time environment showing several applications requiring the same library module according to an embodiment of the invention.

Referring to FIG. 5A, a dynamic pre-operating system build time environment 50 includes a number (here four) of applications A1-D1, some of which are EFI applications and some of which are non-EFI applications, and all of which require functionality from ABI conforming EFI library module N1. The dynamic loader 46 is built into each application as part of the compilation process. Then the dynamic loader 46 copies ABI conforming EFI library N1 into each of the applications.

Figure 5B:
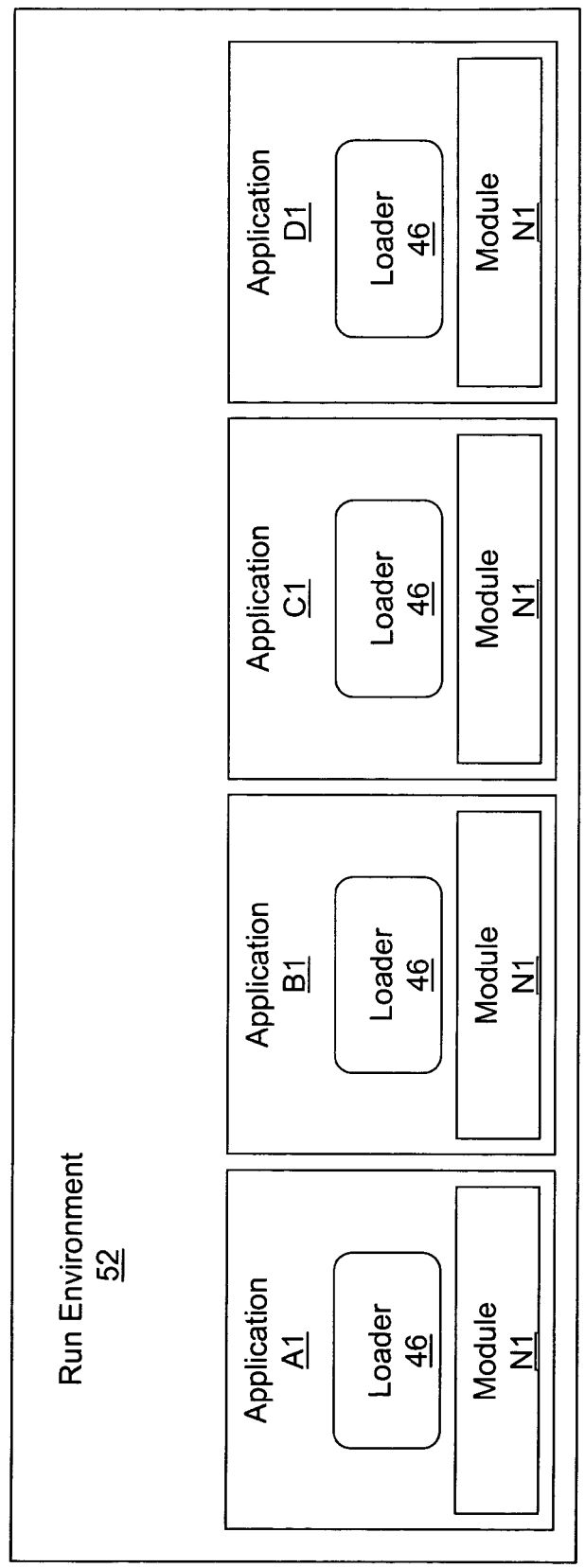
FIG. 5B is a block diagram of a run time environment of the several applications of FIG. 5A with the same library module loaded according to an embodiment of the invention.

Referring to FIG. 5B, the dynamic pre-operating system run time environment 52 associated with the dynamic pre-operating build environment 50 (FIG. 5A) continues to have access to the loader 46. Each application's dynamic loader 46 links the relocatable machine code of the module N1 to the machine code of the applications A1-D1 and produces four applications in absolute machine code format capable of being executed.

Figure 5C:
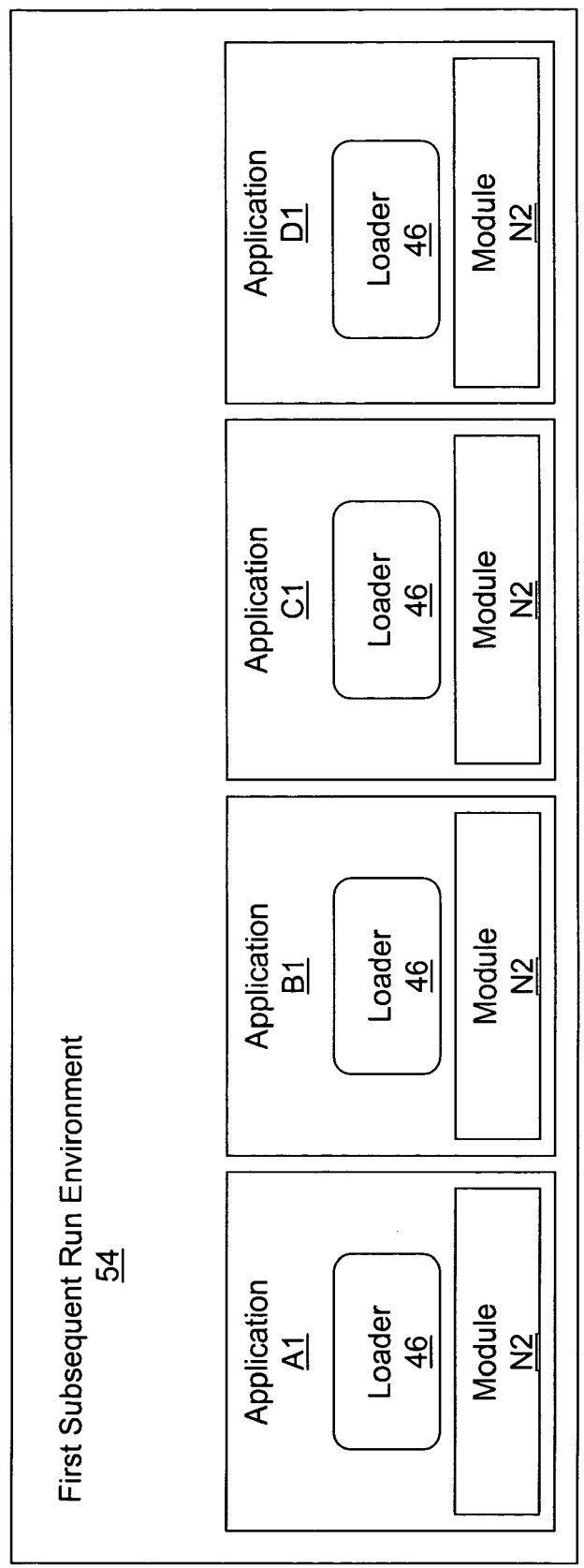
FIG. 5C a block diagram of a subsequent run time environment showing the several applications of FIG. 5A with an upgraded library module dynamically loaded according to an embodiment of the invention.

Referring to FIG. 5C, a first subsequent dynamic pre-operating system run time environment 54 includes the same four applications A1-D1, each of which incorporates a dynamic loader 46 that links and loads an upgraded ABI conforming EFI library N2 prior to execution. None of the applications need to be recompiled to change the functionality associated with the upgraded ABI conforming EFI library N2.

Figure 5D:
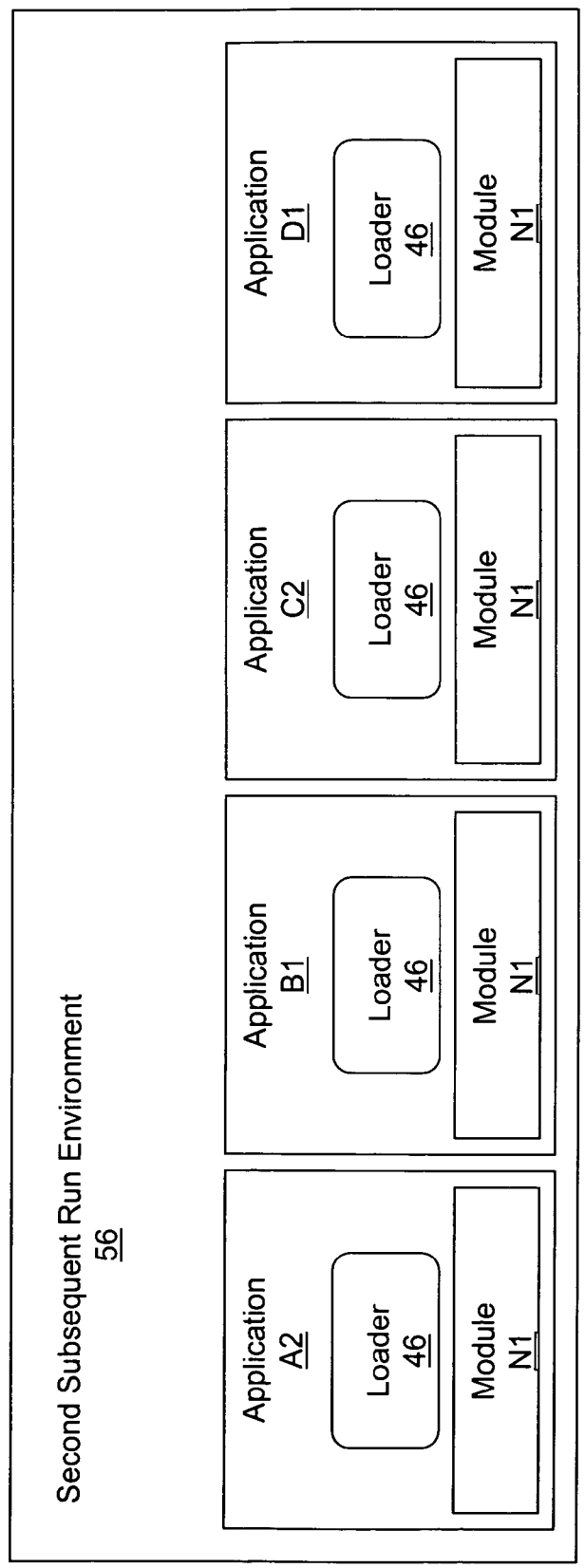
FIG. 5D a block diagram of a subsequent run time environment showing several upgraded applications relative to FIG. 5B with a common library module dynamically loaded according to an embodiment of the invention.

Referring to FIG. 5D, a second subsequent dynamic pre-operating system run time environment 56 includes the same four applications, but two of the applications have different additional functionality. Application A2 is an upgrade of application A1 (FIG. 5B) and application C2 is an upgrade of application C1 (FIG. 5B). These two applications are separately recompiled and when linked and loaded access the new functionality from the ABI conforming library. There is no need for a recompilation of the entire set of applications and modules.

Referring to FIG. 6A, a dynamic pre-operating system build time environment 60 includes a dynamic loader 46, a base application E0 capable of different functionality based on which ABI conforming library modules are referenced, and a set of ABI conforming library modules X-Z. The compiler places a copy of the dynamic loader 46 in each version of the application. The dynamic loader 46 will then copy relocatable machine code of the referenced ABI conforming library modules into the applications.

Figure 6B:
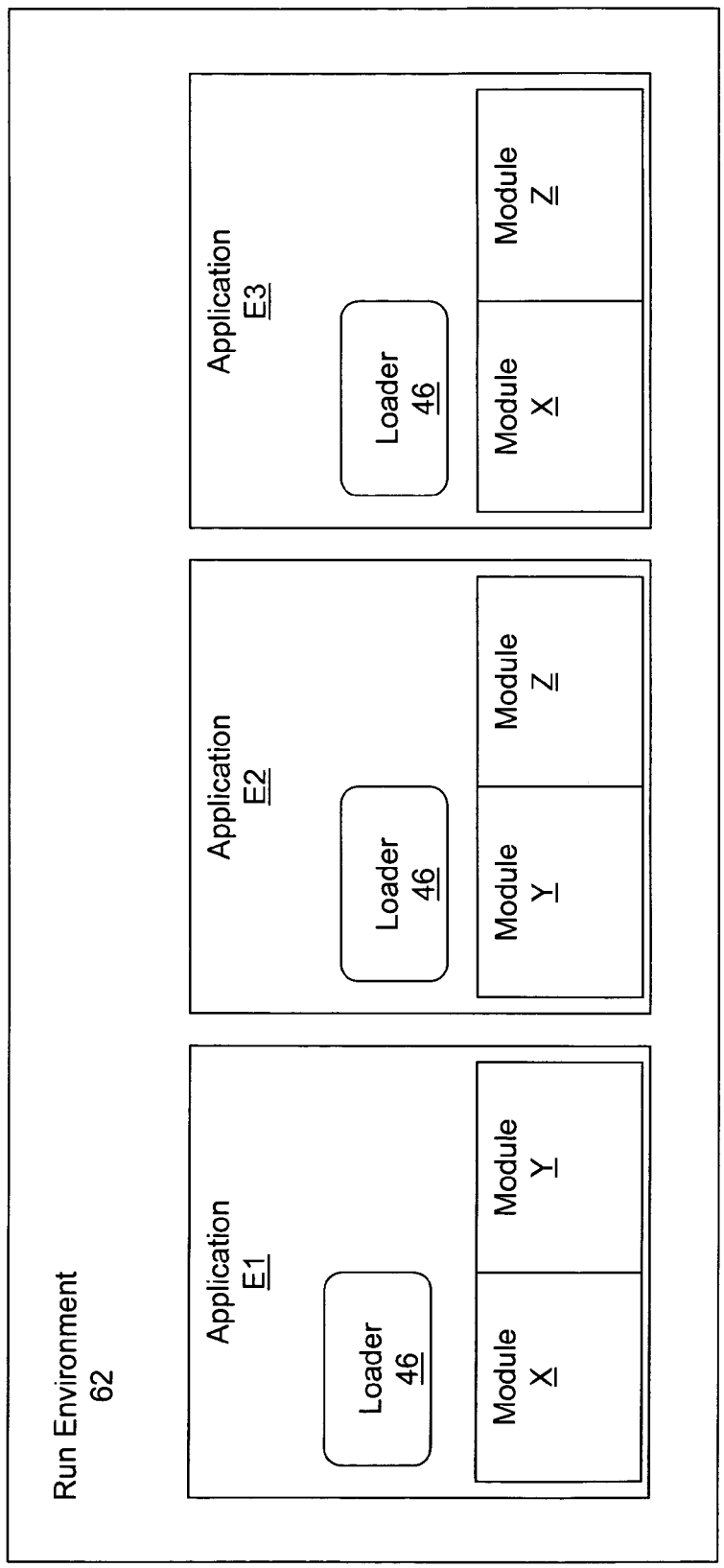
FIG. 6B is a block diagram of a run time environment showing the application of FIG. 6A becoming several different applications based on different sets of library modules according to an embodiment of the invention.

Referring to FIG. 6B, the dynamic pre-operating system run time environment 62, which associated with the dynamic pre-operating system build time environment 60 (FIG. 6A) shows three different derived applications E1-E3, each with a different set of ABI conforming library modules X-Z. Application E1 includes the functionality of module X and module Y, application E2 includes the functionality of module Y and module Z, and application E3 includes the functionality of module X and module Z. One can change the functionality of any of these applications E1-E3 at any subsequent run time without recompiling the applications. For example, one can modify the application E3 to also include the functionality of the module Y by having the loader 46 load the module Y at the start of a subsequent run time.

Figure 7:
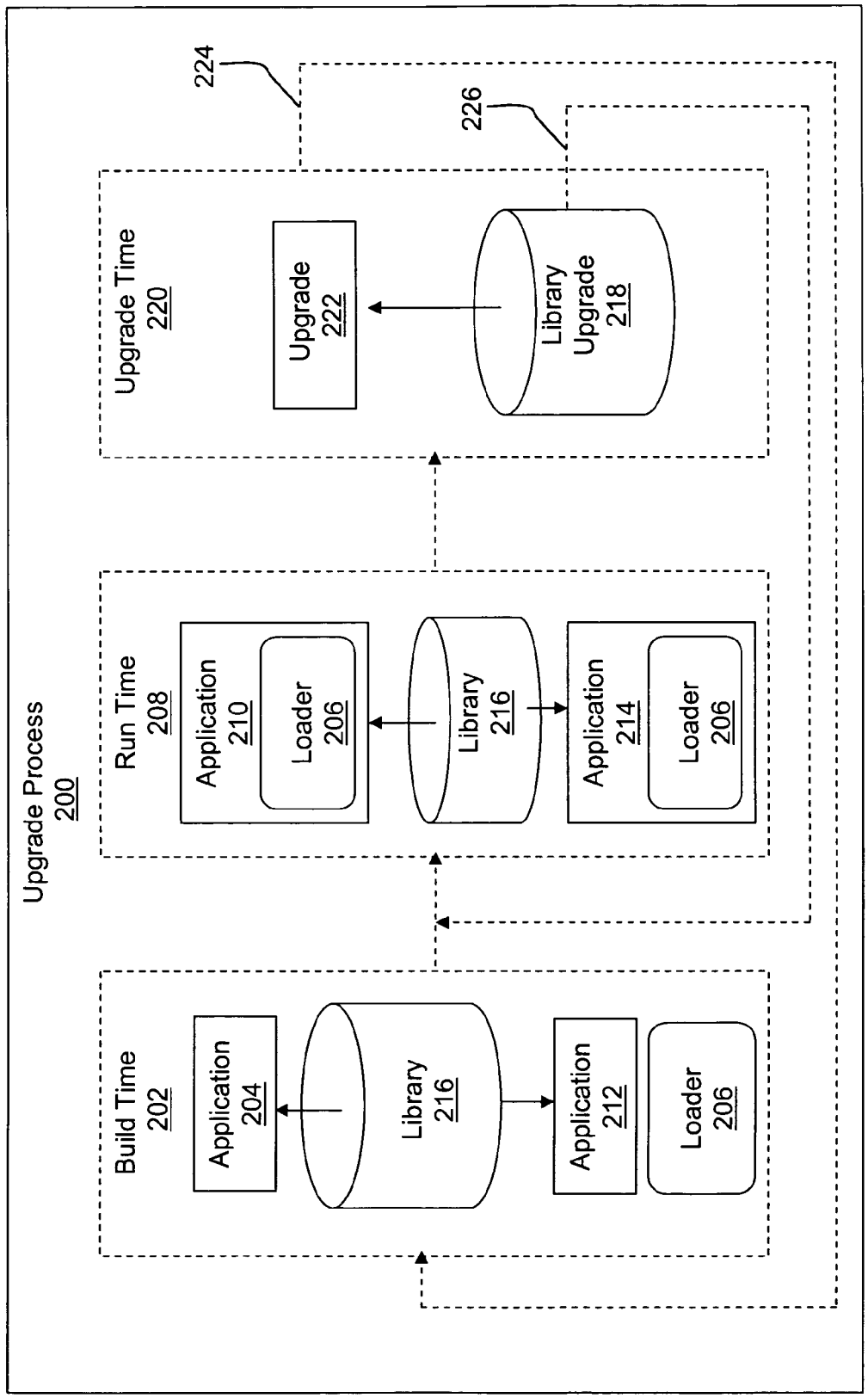
FIG. 7 is a functional diagram showing a system verification process with a dynamic loader according to an embodiment of the invention.

Referring to FIG. 7, a dynamic pre-operating system environment upgrade process 200 includes a dynamic build time environment 202, a dynamic run time environment 208, and an upgrade environment 220. As previously described, during dynamic build time 202, EFI applications 204 and non-EFI applications 212 are compiled using the ABI conforming EFI library 216 to satisfy function call references. This is done by the dynamic loader 206, which after being made part of each application by the compiler, copies modules from the EFI library 216 into the applications. During the subsequent dynamic run time 208, the dynamic loader 206 in the compiled EFI application 210 links all referenced library modules and then is executed. Also, during the subsequent dynamic run time 208, the dynamic loader 206 in the compiled non-EFI application 214 links all referenced library modules and then is executed. If there is a code upgrade 222 to an EFI application or a non-EFI application during an upgrade time 220, the process returns to the build time environment 202 via the path 224 and recompiles the applications. If there is a code upgrade to a referenced library module, the process returns to the dynamic run time environment 208 via the path 226 after recompiling the upgraded ABI conforming EFI library 218 with the upgraded module, thus changing or adding functionality to the application without needing to recompile the application.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An electronic system, comprising:
a library memory space configured to store a pre-operating system library that includes a first instance of a library module;
an application memory space configured to store a pre-operating system application that includes a dynamic loader that is configured to load before booting an operating system and to execute outside of an extensible firmware interface environment and is configured to generate a second instance of the library module from the first instance and to link the second instance of the module with the pre-operating-system application; and a processor coupled to the library memory space and the application memory space and configured to,
execute the dynamic loader at run time, and
under the control of the dynamic loader, to generate the second instance of the library module from the first instance and to link the second instance of the module with the application.

2. The system of claim 1 wherein the loader is further configured to add functionality to the application at a first subsequent run time.

3. The system of claim 1 wherein the loader is further configured to remove functionality from the application at a second subsequent run time.

4. The system of claim 1 wherein the loader is further configured to modify functionality of the application at a third subsequent run time.

5. The system of claim 1 wherein the library is in application binary format.

6. The system of claim 5 wherein the binary format of the library is ELF64.

7. The system of claim 1 wherein linking further comprises parsing the contents of the second instance of the module.

8. The system of claim 7 wherein linking further comprises relocating addresses.

9. The system of claim 8 wherein linking further comprises resolving dependencies between the application and the module.

10. A method, comprising:
storing a pre-operating-system library that includes a first instance of a library module in a library memory space;
compiling a pre-operating-system application from source code, the pre-operating-system application configured to execute inside of an extensible firmware interface environment in an application memory space and is configured to store a second instance of the library module;
adding a dynamic loader to the pre-operating-system application before booting an operating system that is configured to execute outside of an extensible firmware interface environment and is configured to generate the second instance of the library module from the first instance and to link the second instance of the module with the pre-operating-system application; and
booting the operating system wherein the operating system may execute the pre-operating-system application having a dynamic loader already added.

11. The method of claim 10 further comprising:
accessing a run time library;
loading a module from the library into the application at run time; and
executing the application.

12. The method of claim 11 further comprising:
upgrading the application;
recompiling the upgraded application;
subsequently reloading the module from the library into the upgraded application; and
re-executing the upgraded application.

13. The method of claim 11 further comprising:
upgrading the module;
recompiling the upgraded module;
subsequently loading the upgraded module from the library into the application; and
re-executing the application.

14. The method of claim 11 further comprising loading a plurality of modules.

15. The method of claim 14 further comprising:
upgrading the modules;
recompiling the upgraded modules;
subsequently loading the upgraded modules from the library into the application; and
re-executing the application.

16. The method of claim 14 further comprising:
upgrading a subset of the modules;
recompiling the upgraded subset of the modules;
subsequently reloading the upgraded modules from the library into the application; and
re-executing the application.

17. The method of claim 11 wherein loading further comprises parsing the contents of the module.

18. The method of claim 17 wherein loading further comprises relocating a relocatable binary module.

19. The method of claim 18 wherein loading further comprises linking dependencies between the application and the module.

20. The method of claim 11 further comprising executing the application a plurality of times.

21. The method of claim 11 wherein executing further comprises referencing global variables from the modules.

22. The method of claim 14 wherein loading further comprises:
placing a first set of the modules into a first derived application;
placing a second set of the modules into a second derived application; and
independently re-executing the derived applications.

23. The method of claim 22 wherein there is any number of non-proper sets and derived applications.

24. The method of claim 11 further comprising verifying firmware.

25. The method of claim 11 further comprising verifying hardware.

26. The method of claim 10 further comprising:
writing the application to media;
reading the media at a later time; and
executing the application.

27. The method of claim 26 further comprising:
reading the media;
accessing a run time library from the media;
loading a module from the library into the application at run time; and
executing the application.

28. The method of claim 10 wherein adding the dynamic loader comprises adding the dynamic loader to the pre-operating system application during the compiling of the pre operating system application.

* * * * *